United States Patent
Brady et al.

(10) Patent No.: US 10,592,689 B2
(45) Date of Patent: Mar. 17, 2020

(54) SELECTIVE CONTAINER USE FOR DEVICE USAGE SESSIONS

(71) Applicant: Microsoft Technology Licensing, LLC, Redmond, WA (US)

(72) Inventors: Kyle Thomas Brady, Seattle, WA (US); John C. Gordon, Newcastle, WA (US); Benjamin M. Schultz, Bellevue, WA (US); Ali Hajy, Seattle, WA (US); Morakinyo Korede Olugbade, Seattle, WA (US); Hari R. Pulapaka, Redmond, WA (US); Paul Bozzay, Redmond, WA (US); Frederick J. Smith, Redmond, WA (US); Mehmet Iyigun, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/299,107

(22) Filed: Oct. 20, 2016

(65) Prior Publication Data
US 2018/0114034 A1  Apr. 26, 2018

(51) Int. Cl.
*G06F 21/62* (2013.01)
*G06F 9/455* (2018.01)
*G06F 9/445* (2018.01)

(52) U.S. Cl.
CPC .......... *G06F 21/6245* (2013.01); *G06F 9/455* (2013.01); *G06F 9/4451* (2013.01); *G06F 9/44594* (2013.01)

(58) Field of Classification Search
CPC ... G06F 21/6245; G06F 9/455; G06F 9/45558
(Continued)

(56) References Cited

U.S. PATENT DOCUMENTS

| | | |
|---|---|---|
| 6,629,129 B1 | 9/2003 | Bookspan et al. |
| 7,124,164 B1 | 10/2006 | Chemtob |

(Continued)

FOREIGN PATENT DOCUMENTS

| | | |
|---|---|---|
| EP | 1435584 A1 | 7/2004 |
| WO | WO-2000043898 | 7/2000 |

(Continued)

OTHER PUBLICATIONS

"Sharing content during a meeting", Retrieved on: Sep. 14, 2016, Available at: https://helpx.adobe.com/adobe-connect/using/sharing-content-meeting.html.

(Continued)

*Primary Examiner* — Haresh N Patel

(57) ABSTRACT

Different containers are used for different usage sessions, a container referring to a virtualization layer for a computing device and used for isolation as well as hardware resource partitioning. A usage session refers to the time span beginning when one or more users begin to use the computing device, and ending when the one or more users cease using the computing device. During a particular usage session that uses a container, all interaction with the computing device is maintained in the container. The container is deleted when the usage session ends, leaving no data from the usage session behind after the usage session ends. Additionally, some usage sessions need not be run in containers, so data generated during such usage sessions is maintained after usage session ends. The host operating system automatically determines which usage sessions to run in containers and which usage sessions to run separate from any containers.

20 Claims, 4 Drawing Sheets

(58) Field of Classification Search
USPC .......................................................... 726/26
See application file for complete search history.

(56) References Cited

U.S. PATENT DOCUMENTS

| | | | |
|---|---|---|---|
| 7,492,472 | B2 | 2/2009 | Penke et al. |
| 7,679,518 | B1 | 3/2010 | Pabla et al. |
| 7,698,400 | B1 | 4/2010 | Beloussov et al. |
| 7,975,073 | B2 | 7/2011 | Gonen et al. |
| 8,161,173 | B1 | 4/2012 | Mishra et al. |
| 8,402,091 | B2 | 3/2013 | Karniely |
| 8,429,540 | B1 | 4/2013 | Yankovich et al. |
| 8,490,157 | B2 | 7/2013 | Thompson et al. |
| 8,904,295 | B2 | 12/2014 | Whalin et al. |
| 8,914,006 | B2 | 12/2014 | Bennett |
| 9,032,028 | B2 | 5/2015 | Davidson et al. |
| 9,071,606 | B2 | 6/2015 | Braun et al. |
| 9,071,658 | B2 | 6/2015 | McConnell et al. |
| 9,143,530 | B2 | 9/2015 | Qureshi et al. |
| 9,197,644 | B1 | 11/2015 | Sherman et al. |
| 9,215,272 | B2 | 12/2015 | Nelson et al. |
| 9,344,396 | B2 | 5/2016 | Geppert et al. |
| 9,398,059 | B2 | 7/2016 | Shepherd et al. |
| 9,430,140 | B2 | 8/2016 | Reuschel et al. |
| 9,729,579 | B1 | 8/2017 | Marino et al. |
| 10,007,509 | B1 | 6/2018 | Qureshi et al. |
| 2003/0212987 | A1 | 11/2003 | Demuth et al. |
| 2006/0073891 | A1 | 4/2006 | Holt |
| 2009/0094561 | A1 | 4/2009 | Do et al. |
| 2009/0181659 | A1 | 7/2009 | Stalnacke et al. |
| 2010/0017385 | A1* | 1/2010 | Wilcox ............. G06F 17/30884 705/1.1 |
| 2010/0079676 | A1 | 4/2010 | Kritt et al. |
| 2010/0205540 | A1 | 8/2010 | Gupta et al. |
| 2010/0306018 | A1 | 12/2010 | Burtner et al. |
| 2011/0197132 | A1 | 8/2011 | Escoda et al. |
| 2011/0314561 | A1 | 12/2011 | Brill et al. |
| 2011/0321143 | A1 | 12/2011 | Angaluri et al. |
| 2012/0005588 | A1 | 1/2012 | Bastide et al. |
| 2012/0110087 | A1 | 5/2012 | Culver et al. |
| 2012/0304168 | A1 | 11/2012 | Raj Seeniraj et al. |
| 2013/0007465 | A1 | 1/2013 | Movassaghi |
| 2013/0036370 | A1 | 2/2013 | Ananthakrishnan |
| 2014/0214956 | A1* | 7/2014 | Huo ........................ H04L 67/14 709/204 |
| 2014/0317261 | A1 | 10/2014 | Shatzkamer et al. |
| 2014/0317293 | A1 | 10/2014 | Shatzkamer |
| 2015/0081764 | A1 | 3/2015 | Zhao et al. |
| 2015/0082345 | A1* | 3/2015 | Archer .................. H04L 65/605 725/34 |
| 2015/0242629 | A1 | 8/2015 | Lindo et al. |
| 2015/0248459 | A1 | 9/2015 | Miller et al. |
| 2015/0310188 | A1 | 10/2015 | Ford et al. |
| 2016/0080510 | A1 | 3/2016 | Dawoud et al. |
| 2016/0098753 | A1* | 4/2016 | Login ................ G06Q 30/0257 705/14.55 |
| 2016/0142541 | A1* | 5/2016 | Sharpe ................ H04M 3/5141 379/92.01 |
| 2016/0210316 | A1* | 7/2016 | Bendel .............. G06F 17/30566 725/24 |
| 2016/0212012 | A1 | 7/2016 | Young et al. |
| 2016/0261684 | A1 | 9/2016 | Khalaf et al. |
| 2016/0330201 | A1* | 11/2016 | Nguyen-Huu .......... H04L 63/10 725/24 |
| 2017/0134415 | A1 | 5/2017 | Muddu et al. |
| 2017/0214550 | A1 | 7/2017 | Kumar et al. |
| 2017/0270449 | A1 | 9/2017 | Shrimali et al. |
| 2017/0339216 | A1 | 11/2017 | Carlos et al. |
| 2018/0004973 | A1 | 1/2018 | Roimela et al. |
| 2018/0205708 | A1 | 7/2018 | Kurian et al. |
| 2018/0336079 | A1 | 11/2018 | Soman et al. |

FOREIGN PATENT DOCUMENTS

| | | |
|---|---|---|
| WO | WO-2011098749 | 8/2011 |
| WO | WO-2015171030 | 11/2015 |
| WO | 2017035260 A1 | 3/2017 |

OTHER PUBLICATIONS

"GlobalMeet Secure Meetings" Published on: Dec. 2010, Available at: https://www1.maine.gov/oit/services/ServiceDescriptions/GM_SecureMeetings.pdf.

"Microsoft: Deploying Skype Room Systems and Surface Hub devices in meeting rooms", http://www.dabcc.com/microsoft-deploying-skype-room-systems-and-surface-hub-devices-in-meeting-rooms/, Oct. 17, 2016, 14 pages.

"Thin Client Diaries: Meeting Virtualized Skype for Business Needs", https://www.citrix.com/blogs/2016/09/30/thin-client-diaries-meeting-virtualized-skype-for-business-needs/, Retrieved on: Nov. 11, 2016, 9 pages.

Longbottom, "Ensure virtualization containers' security in an app world", http://searchitoperations.techtarget.com/tip/Ensure-virtualization-containers-security-in-an-app-world, Apr. 26, 2016, 8 pages.

Rocker, "SPIROS—A system for privacy-enhanced information representation in smart home environments", In Proceedings of the Second International Conference on Intelligent Environments, Jul. 5, 2006, 8 pages.

Scott, "Cross-device transfer in a collaborative multi-surface environment without user identification", In Proceedings of International Conference on Collaboration Technologies and Systems, May 19, 2014, pp. 219-226.

Sheng, "Introducing RancherVM: Package and Run Virtual Machines as Docker Containers", http://rancher.com/introducing-ranchervm-package-and-run-virtual-machines-as-docker-containers/, Apr. 16, 2015, 9 pages.

"Non Final Office Action Issued in U.S. Appl. No. 15/476,641", dated Jun. 13, 2018, 15 Pages.

"International Search Report & Written Opinion Issued in PCT Application No. PCT/US2018/026411", dated Jul. 9, 2018, 12 Pages.

"Non Final Office Action Issued in U.S. Appl. No. 15/621,692", dated Jun. 12, 2019, 12 Pages.

"Final Office Action Issued in U.S. Appl. No. 15/498,234", dated Apr. 15, 2019, 16 Pages.

"Final Office Action Issued in U.S. Appl. No. 15/476,641", dated Jan. 9, 2019, 20 Pages.

"Non Final Office Action Issued in U.S. Appl. No. 15/498,234", dated Jan. 15, 2019, 11 Pages.

"Non Final Office Action Issued in U.S. Appl. No. 15/498,234", Dated Sep. 11, 2019, 17 Pages.

"Final Office Action Issued in U.S. Appl. No. 15/621,692", Dated Nov. 13, 2019, 24 Pages.

* cited by examiner

SELECTIVE CONTAINER USE FOR DEVICE USAGE SESSIONS

BACKGROUND

As computing technology has advanced, computers have become commonplace. People use their computers for various different tasks, including accessing various information or communicating information to other users. While accessing such information is useful, it is not without its problems. One such problem is that people oftentimes desire to keep the information they access private. However, allowing users to share their computers with other users while at the same time keeping such information private can be a difficult task.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a determination is made that a usage session for a user accessing the computing device is beginning. In response to the usage session beginning, an automatic determination to run the usage session in a container is made. Actions for the usage session are performed in a container associated with the usage session, and a determination is made that the usage session is ending. In response to the usage session ending, the container and content generated during the usage session are deleted.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
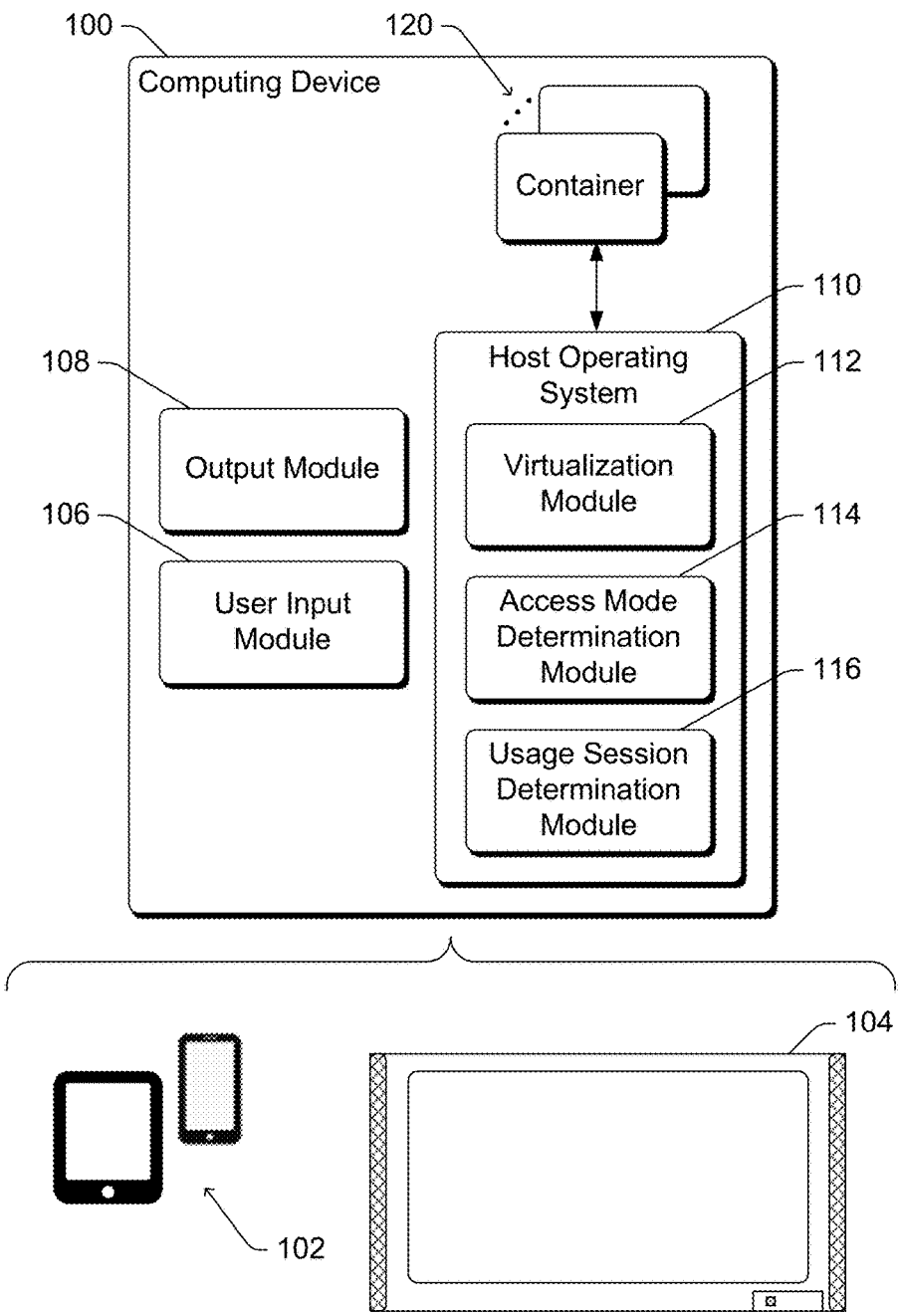
FIG. 1 is a block diagram illustrating an example computing device implementing the container based device usage sessions in accordance with one or more embodiments.

Container based device usage sessions are discussed herein. The techniques discussed herein support using different containers for different usage sessions. A container refers to a virtualization layer for the computing device and is used for isolation as well as hardware resource partitioning. A container can include one or more of various different components, such as a base operating system (e.g., an operating system kernel), a user-mode environment, an application or program, virtual devices (e.g., processors, memory), operating system services, combinations thereof, and so forth. A usage session refers to the time span beginning when one or more users begin to use the computing device, and ending when the one or more users cease using the computing device.

During a particular usage session that uses a container, most interaction with the computing device is maintained in the container. This interaction can be input or generation of data, access to one or more files, and so forth. The container is deleted when the usage session ends, leaving no data from the usage session behind after the usage session ends. Thus, any data input, generated, and so forth during one usage session is not available to other users during other usage sessions. Various configuration parameters can also be defined by the owner or administrator of the device to restrict what users can do in a container.

The computing device can selectively run some usage sessions in containers but not other usage sessions. For example, if a user enters a personal identification number (PIN) or password, then the computing device is unlocked and the usage session run without running the usage session in a container. However, if a user simply inputs a swipe gesture without providing a PIN or password, then the computing device puts the usage session in a container. The computing device can thus implicitly put some usage sessions in containers and not put other usage sessions in containers.

The techniques discussed herein provide security to both the owner of the device and other users of the device. Users can walk up and use a computing device, such as a computing device displaying a virtual dry erase board in a conference room, interact with the computing device, and then leave secure in the knowledge that any data they entered while using the computing device is not maintained by the computing device. The users know that the data they enter or access will not be maintained by the computing device and will not be made available to other users of the computing device. Additionally, users can share their computing devices, such as sharing their smartphone or tablet computer with another user. The owner of the computing device can allow others to use the computing device, the owner of the computing device being secure in the knowledge that access to the user's private information is not available to the others user, and the other users being secure in the knowledge that any data they entered while using the computing device is not maintained by the computing device.

FIG. 1 is a block diagram illustrating an example computing device 100 implementing the container based device usage sessions in accordance with one or more embodiments. Examples of computing device 100 are shown as mobile devices 102 and a virtual meeting hosting device 104 (e.g., including a touchscreen operating as a virtual dry erase board). However, it should be noted that the computing device 100 can be any of a variety of different types of devices, such as a virtual meeting hosting device, a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet, an augmented reality (AR) device, a virtual reality (VR) device), an entertainment device (e.g., an entertainment appliance, a set-top box communicatively coupled to a display device, a game console), Internet of Things (IoT) devices (e.g., objects or things with software, firmware, and/or hardware to allow communication with other devices), a television or other display device, an automotive computer, and so forth. Thus, computing device 100 may range from full resource devices with substantial memory and processor resources (e.g., personal computers, game consoles) to low resource devices with limited memory and/or processing resources (e.g., traditional set-top boxes, hand-held game consoles).

The computing device 100 includes a user input module 106, an output module 108, and a host operating system 110. The user input module 106 receives user inputs from a user of the computing device 106. User inputs can be provided in a variety of different manners, such as by pressing one or more keys of a keypad or keyboard of the computing device 100, pressing one or more keys of a controller (e.g., remote control device, mouse, track pad, etc.) of the computing device 100, pressing a particular portion of a touchpad or touchscreen of the computing device 100, making a particular gesture on a touchpad or touchscreen of the computing device 100, and/or making a particular gesture on a controller (e.g., remote control device, mouse, track pad, etc.) of the computing device 100. User inputs can also be provided via other physical feedback input to the computing device 100, such as tapping any portion of the computing device 100, an action that can be recognized by a motion detection or other component of the computing device 100 (such as shaking the computing device 100, rotating the computing device 100, bending or flexing the computing device 100, etc.), and so forth. User inputs can also be provided in other manners, such as via voice or other audible inputs to a microphone, via motions of hands or other body parts observed by an image capture device, and so forth.

The output module 108 generates, manages, and/or outputs content for display, playback, and/or other presentation. This content can be created by the output module 108 or obtained from other modules of the computing device 100. This content can be, for example, a display or playback portion of a user interface (UI). The content can be displayed or otherwise played back by components of the computing device 100 (e.g., speakers, interactive display devices, etc.). Alternatively, the output module 108 can generate one or more signals that are output to other devices or components (e.g., speakers, display devices, etc.) that are separate from the computing device 100.

In one or more embodiments, the host operating system 110 includes a shell and a kernel. The operating system kernel manages operation of the host operating system 110, allowing various additional modules or components to run, manages running of applications on the computing device 100, and so forth. The operating system shell provides a user interface for users of the computing device 100 to interact with the host operating system 110 as well as other applications running on the computing device 100.

The host operating system 110 includes a virtualization module 112, an access mode determination module 114, and a usage session determination module 116. The virtualization module 112 manages running multiple containers 120 on the computing device 100. Each of these containers 120 is a virtualization layer for the computing device 100 used for hardware resource partitioning as discussed in more detail below.

Some usage sessions are run in a container whereas other usage sessions are run separate from a container. A usage session refers to the time span beginning when one or more users begin to use the computing device, and ending when the one or more users cease using the computing device. The access mode determination module 114 operates to determine whether a particular usage session of the computing device 100 is to be run in a container or separate from any container. Whether a particular usage session is to be run in a container or separate from any container can be determined based on various different criteria, such as whether the user of the computing device is the owner of the computing device. The usage session 116 identifies usage sessions (e.g., the beginning of each usage session and the ending of each usage session), as discussed in more detail below.

Running a usage session in a container 120 refers to running applications during the usage session in the container 120. Some additional operating system programs are also optionally run in the container 120. The container 120 in which the usage session is run is also referred to as associated with the usage session.

For usage sessions that are run in containers 120, a different container 120 is used for each usage session. The container 120 for a usage session is deleted at the end of the usage session, and a new usage session is used for the next usage session. Various different applications can be run in the containers 120. Each container 120 virtualizes hardware of the computing device 100, such as processors, storage devices, memory, and so forth. The virtualization module 112 optionally stores data for each container 120 on a storage device of the computing device 100, although that data is deleted by the virtualization module 112 when the container is deleted. In one or more embodiments, the data stored in the container 120 is also encrypted, such as by the virtualization module 112.

The containers 120 can be implemented in different manners. Each of the containers 120 can be implemented in the same manner, or alternatively different ones of the containers 120 can be implemented in different manners.

Figure 2:
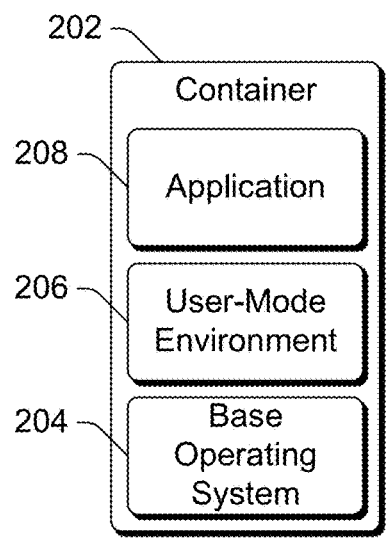
FIG. 2 illustrates an example container in accordance with one or more aspects.

FIG. 2 illustrates an example container 202 in accordance with one or more aspects. The container 202 includes multiple components illustrated as a base operating system (e.g., an operating system kernel) 204, a user-mode environment 206, and an application 208. The base operating system 204 component provides various different low level system services to components in the container, such as session management, program execution, input/output services, resource allocation, and so forth. The base operating system 204 component can be a full operating system, or alternatively only a portion of a full operating system (e.g., the base operating system component may be a very small component if the container shares most of the operating system with the host (in particular, the kernel)). The user-mode environment 206 component provides a runtime environment for applications in the container (e.g., a Java Runtime Environment, a .NET framework, and so forth). The application 208 component is an application that is desired (e.g., by a user, administrator, other program, etc.) to be run in the container (e.g., a web service, a calculation engine, etc.).

Although a single application 208 is illustrated in the container 202, it should be noted that the container 202 can include multiple applications. Different containers can include the same application, or alternatively different containers can include different applications. Similarly, different containers can include the same base operating system and the same user-mode environment, or alternatively different containers can include different base operating systems and/or different user-mode environments. The container 202 can also optionally include various additional components, such as various different virtual devices (e.g., processors, memory, storage devices, and so forth).

The different components of the container 202 are also referred to as being at different layers or levels. In the illustrated example of FIG. 2, the base operating system 204 is at the lowest layer or level, the user-mode environment 206 is at the next lowest layer or level, and the application 208 is at the highest layer or level. The component at a particular layer is started by or launched from a lower layer (typically the closest lower layer). For example, the user-mode environment 206 is started or launched by the base operating system 204, and the application 208 is started or launched by the user-mode environment 206. These layers or levels typically form a dependency hierarchy (e.g., an application depends on a specific version of a runtime environment (a user-mode environment), and the runtime environment depends on a specific base operating system)—it is usually not possible to replace a lower layer with a different version without invalidating the upper layers.

It should be noted that although the separation of components into base operating system, user-mode environment, and application components is one approach, containers can include a variety of layers. For example, the user-mode environment itself can be constructed from multiple layers. It should also be noted that one characteristic of the layers is that layers at a lower level are typically more generic (e.g., the base operating system), and layers at a higher level are typically more specialized (e.g., the specific application).

In one or more embodiments, the container 202 is also referred to as a virtual machine. In such embodiments, the host operating system 110 of FIG. 1 can run a hypervisor, and the hypervisor manages the container 202. Alternatively, the computing device 100 can run a hypervisor rather than the host operating system 110. In such situations, the virtualization module 112, the access mode determination module 114, and the usage session determination module 116 are implemented in the hypervisor, and the hypervisor manages the container 202.

Figure 3:
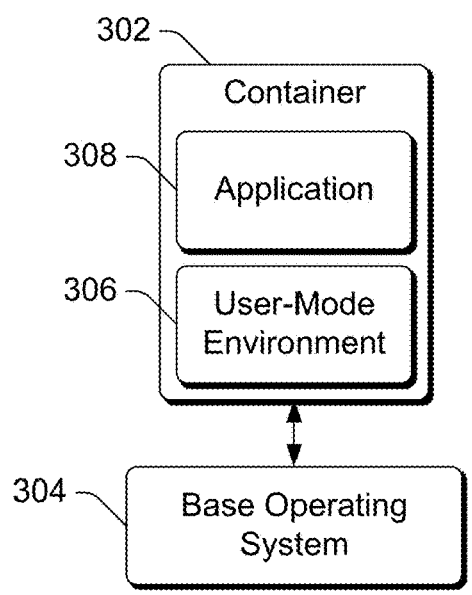
FIG. 3 illustrates another example container in accordance with one or more embodiments.

FIG. 3 illustrates an example container 302 in accordance with one or more embodiments. The container 302 includes user-mode environment 306 and application 308, analogous to the user-mode environment 206 and application 208 in the example of FIG. 2. However, in the example shown in FIG. 3 a base operating system 304 (e.g., an operating system kernel) is used by the container 302 as well as the other containers. Thus, rather than the base operating system being included as part of each container as illustrated in the example of FIG. 2, a single base operating system is shared by the multiple containers in the example of FIG. 3. The base operating system 304 can be, for example, the host operating system 110 of FIG. 1.

Although a single application 308 is illustrated in the container 302, it should be noted that the container 302 can include multiple applications. Different containers can include the same application, or alternatively different containers can include different applications. Similarly, different containers can include the same base operating system and the same user-mode environment, or alternatively different containers can include different base operating systems and/or different user-mode environments. The container 302 can also optionally include various additional components.

Similar to the discussion of FIG. 2, the different components of the container 302 are also referred to as being at different layers or levels. In the illustrated example of FIG. 3, the user-mode environment 306 is at the lowest layer or level and the application 308 is at the highest layer or level. The component at a particular layer is started by or launched from a lower layer (typically the closest lower layer). For example, the application 308 is started or launched by the user-mode environment 306. The user-mode environment 306 of the container 302 is started or launched by the base operating system 304. Although not part of the container 302, the base operating system 304 can also be referred to as being at a lower layer or level than the user-mode environments 306.

Returning to FIG. 1, regardless of the manner in which a container 120 is implemented (e.g., as a container 202 of FIG. 2 or a container 302 of FIG. 3), various content can be generated during operation of the container 120. The container 120 is referred to as being in operation during the usage session associated with the container 120. The content generated during operation of the container 120 refers to various data or information generated by or used by an application running in the container 120, such as data input by a user, data received from another device or system, and so forth. The content generated during operation of the container 120 can also include data or files created as a result of installing an application on the computing device 100. The content generated during operation of the container 120 is deleted when the usage session associated with the container 120 ends. Thus, at the end of the usage session, no content generated during operation of the container 120 remains on the computing device 100.

For example, during operation of a container 120 a user may input data to an application running in the container 120. This data could be a phone number that the application is to call, numbers or values regarding sales or projections that the application is to add or perform other mathematical operations on, drawings of product plans or problem solutions that are displayed on a virtual dry erase board, and so forth. Such data is deleted and not maintained by the computing device 100 when the container 120 is deleted.

The content generated during operation of the container 120 can be stored in different types of memory or storage devices of the computing device 100. In some situations, content generated during operation of the container 120 is stored in physical memory of the computing device 100, such as random access memory (RAM). In such situations, when the container 120 is deleted, any memory allocated to the container 120 is de-allocated. As part of the de-allocation process, the memory is made available for other applications or containers to use, and no record of the content in the memory is maintained. Various additional security precautions can optionally be taken by the virtualization module 112 to be sure the memory cannot be accessed to retrieve any of the content, such as overwriting the memory that was allocated to the container 120 (e.g., with random values, with all 0's or all 1's, combinations thereof, and so forth).

Additionally or alternatively, in some situations content generated during operation of the container 120 is stored on a nonvolatile storage device of the computing device 100, such as non-volatile memory, Flash memory, a solid state drive, a magnetic disk, an optical disc, and so forth. In such situations, when the container 120 is deleted, any content written to the storage device, including any files written by the application, are deleted. Various additional security precautions can optionally be taken by the virtualization module 112 to be sure the storage device cannot be accessed to retrieve any of the content, such as overwriting the portion(s) of the storage device where the file was stored (e.g., with random values, with all 0's or all 1's, combinations thereof, and so forth), encrypting the data for the operational lifetime of the container, and so forth.

The virtualization module 112 can support writing data to a storage device in various different manners, and the manner in which content written to the storage device is deleted varies based on the manner in which the virtualization module 112 writes data to the storage device. In one or more embodiments, the virtualization module 112 provides a virtual hard disk (VHD) to the applications running in the container. The data stored to the VHD may be written as a VHD file to physical memory of the computing device 100 and/or to a storage device of the computing device 100. If the VHD file is written to physical memory (e.g., RAM) of the computing device 100, then the VHD file is deleted from physical memory as discussed above. If the VHD file is written to a storage device of the computing device 100, then the VHD file is deleted from the storage device as discussed above.

Additionally or alternatively, the virtualization module 112 may maintain all files written to from the container 120 (e.g., written by an application running in the container 120) in a particular portion of the storage device. For example, the virtualization module 112 may use a particular folder or directory on the storage device for all files written to the storage device from the container 120. All files within that particular folder or directory are then deleted from the storage device as discussed above when the container 120 is deleted.

A container 120 for a usage session can be generated at a variety of different times. In one or more embodiments, the container 120 for a usage session is generated in response to the usage session beginning. Additionally or alternatively, the container 120 for a usage session can be generated at other times. For example, a container 120 can be generated prior to the beginning of the usage session, but not associated with the usage session until the usage session begins. By way of another example, multiple containers can be generated in a batch and placed in a pool or queue for later use. These multiple containers can all be the same type of container, or alternatively can be different types of containers (e.g., for different classes or groups of users) as discussed in more detail below. When a new usage session begins, one of the containers in the pool or queue is associated with the usage session. The containers in the pool or queue can optionally be placed in a paused state (e.g., no applications or programs in the container are scheduled for execution on the computing device 100). When a new usage session begins, the container from the pool or queue that is associated with the usage session can be resumed (taken out of the paused state so that applications or programs in the container are scheduled for execution on the computing device 100).

The usage session determination module 116 identifies usage sessions on the computing device 100. As discussed above, a usage session refers to the time span beginning when one or more users begin to use the computing device 100, and ending when the one or more users cease using the computing device 100. The beginning of the usage session is the time at which one or more users begin to use the computing device 100. The usage session determination module 116 can determine that one or more users have begun to use the computing device 100 in a variety of different manners. In one or more embodiments, the usage session determination module 116 determines that one or more users have begun to use the computing device 100 in response to a user input being received at the computing device, such as a user providing his or her fingerprint, a user touching or inputting a gesture on a touchscreen device, a user speaking an audible command, a user request to unlock the computing device (e.g., by motion of the user or the computing device 100, by input via a touchscreen of the computing device 100, by audio input, etc.). Additionally or alternatively, the usage session determination module 116 can determine that one or more users have begun to use the computing device in other manners, such as in response to a user being detected in close physical proximity (e.g., within a threshold distance, such as 5 feet) to the computing device 100.

The ending of the usage session is the time at which the one or more users cease using the computing device 100. The usage session determination module 116 can determine that the one or more users have ceased using the computing device 100 in a variety of different manners. In one or more embodiments, the usage session determination module 116 determines that the one or more users have ceased using the computing device 100 in response to a user input being received at the computing device, such as a user touching or inputting a gesture on a touchscreen device, a user speaking an audible command, a user request to lock the computing device (e.g., by motion of the user or the computing device 100, by input via a touchscreen of the computing device 100, by audio input, etc.). Additionally or alternatively, the usage session determination module 116 can determine that one or more users have ceased using the computing device in other manners, such as in response to no users being detected in close physical proximity (e.g., within a threshold distance, such as 5 feet) to the computing device 100, in response to no user input being received for a threshold amount of time (e.g., 3 minutes). Additionally or alternatively, the usage session determination module 116 can determine that one or more users have ceased using the computing device 100 because a shutdown is imminent (e.g., will occur within a threshold amount of time, such as 5 minutes, due to patching, servicing, no remaining power, etc.) to the computing device 100, and so forth.

The access mode determination module 114 determines whether to run each usage session in a container 120 or separate from containers 120. Running a usage session separate from containers 120 refers to running one or more applications on the host operating system 110. Hardware resources need not be, and typically are not, virtualized for usage sessions running separate from containers 120. For a usage session run separate from containers 120, data input during the usage session can be maintained by the computing device 100, such as files being stored and maintained on a storage device of the computing device 100.

The access mode determination module 114 automatically determines whether to run a usage session in a container 120 or separate from containers 120. In one or more embodiments, the access mode determination module 114 by default runs each usage session in a container 120 unless a particular user input is received. If the particular user input is received, then a usage session is begun and the usage session is run separate from containers 120. The particular user input can take various forms, such as user request to unlock the computing device 100 (e.g., by providing a fingerprint or PIN), a user request to log into the computing device 100 (e.g., by providing a user name and password), and so forth.

Additionally or alternatively, the access mode determination module 114 can automatically determine whether to run a usage session in a container 120 or separate from containers 120 in other manners. For example, the access mode determination module 114 can implement any of a variety of public and/or proprietary voice recognition or object (e.g., face, other biometric) recognition techniques. The access mode determination module 114 can identify particular users based on their voices and/or visual (e.g., facial, other biometric) features, and determine whether to run a usage session in a container 120 or separate from containers 120 based on the identified users. In one or more embodiments, the access mode determination module 114 can include a set of users for which the usage session is to be run separate from containers 120—if the access mode determination module 114 detects the presence of a user in the set of users at the beginning of the usage session, then the usage session is run separate from containers 120. However, if the access mode determination module 114 does not detect the presence of a user in the set of users at the beginning of the usage session, then the usage session is run in a container 120. Alternatively or additionally, if access mode determination module 114 detects the presence of a user such as the administrator then the session can be run separate from the containers 120.

In one or more embodiments, various restrictions can be imposed on the containers 120 by an owner or administrator of the computing device 100. These restrictions can include what components can be run in each container 120, whether the applications run in the container are to comply with a mobile device management (MDM) system, whether the applications run in the container are to comply with particular group policy and/or administrative settings, and so forth. These restrictions can include restrictions on access to various resources and/or data stored on the computing device 100, such as email applications (and thus email), contact lists (e.g., phone number lists), text messaging applications (and thus text messages), and so forth. The restrictions imposed on the containers 120 are maintained and enforced by the virtualization module 112.

Similarly, various applications for inclusion in the containers 120 can be defined by an owner or administrator of the computing device 100. For each container 120 that is created, the virtualization module 112 includes those various applications in the container 120. For example, there can be a default set of applications defined that are included in each container 120, such as one or more applications associated with touch and virtual dry erase, one or more applications providing camera and voice capability (e.g., for video conferencing or phone calls), one or more collaboration tools to review designs or present content with a particular productivity application (e.g., a slide presentation application, a spreadsheet application), and so forth.

In one or more embodiments, the virtualization module 112 includes multiple different types of containers 120. Different types of containers 120 can have different settings, applications, and so forth. The host operating system 110 also supports more than two classes or groups of users, and uses different types of containers 120 for the different classes of users. Each type of container 120 is associated with a specific class or group of users. The access mode determination module 114 can determine the class or group of a particular user of the computing device 100 in various manners, and then select for a usage session for the particular user a container of a type associated with the class or group of the particular user. For example, the user can provide an input (e.g., make a gesture, touch a button) to identify the class or group of the user. By way of another example, the access mode determination module 114 can have access to a previously determined grouping or classification of various potential users and can identify a current user of the computing device 100 (and thus the appropriate group or class of the current user) based on the user's voice and/or visual (e.g., facial, other biometric) features.

Maintaining different types of containers 120 for different classes or groups of users allows users to have access to containers 120 that are suited for their typical desires or needs. For example, an enterprise may have multiple departments, such as engineering and sales. This enterprise will also have administrators. If employees in the engineering group use the computing device 100 they get a container 120 with engineering applications. If employees in the sales group use the computing device 100, they get a container 120 with the sales applications. If the administrator(s) use the device, the usage session is run separate from any container.

Figure 4:
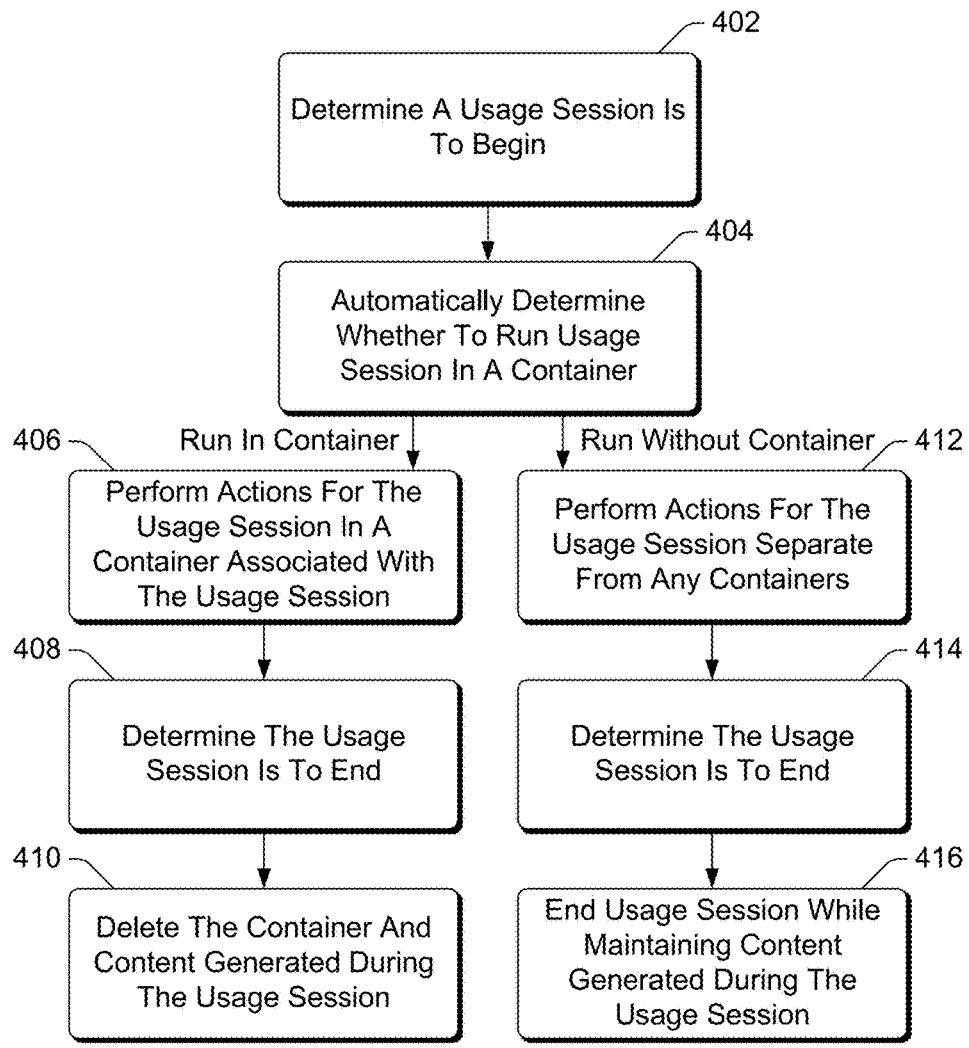
FIG. 4 is a flowchart illustrating an example process for implementing container based device usage sessions in accordance with one or more embodiments.

FIG. 4 is a flowchart illustrating an example process 400 for implementing container based device usage sessions in accordance with one or more embodiments. Process 400 is carried out by a computing device, such as computing device 100 of FIG. 1, and can be implemented in software, firmware, hardware, or combinations thereof. Process 400 is shown as a set of acts and is not limited to the order shown for performing the operations of the various acts. Process 400 is an example process for implementing container based device usage sessions; additional discussions of implementing container based device usage sessions are included herein with reference to different figures.

In process 400, a determination is made that a usage session is to begin (act 402). This determination can be made in various manners as discussed above, such as based on user input to the computing device, based on one or more users being in close physical proximity to the computing device, and so forth.

A determination is automatically made as to whether to run the usage session in a container (act 404). This determination is made in response to the usage session beginning. This determination can be made in a variety of different manners as discussed above, such as what (if any) user input is received at the computing device at the beginning of the usage session.

In response to determining that the usage session is to be run in a container, actions for the usage session are performed in a container associated with the usage session (act 406). The container is associated with the current usage session, and is a different container than other usage sessions are associated with. Various different actions can be performed, such as running various applications, generating content, presenting content, and so forth.

Eventually, a determination is made to end the usage session (act 408). This determination can be made in various manners as discussed above, such as in response to a user input to the computing device, in response to determining that no user input has been received within a threshold amount of time (e.g., 2 minutes), and so forth.

In response to the usage session ending, the container is deleted (act 410). As part of deleting the container, content generated during the usage session is also deleted. This can include various content stored in physical memory and/or storage devices of the computing device as discussed above. The content generated during the usage session is deleted automatically—the user need not take any steps to identify and delete the content generated during the usage session.

Returning to act 404, in response to determining that the usage session is not to be run in a container (e.g., without a container), actions for the usage session are performed separate from any containers (act 412). Various different actions can be performed, such as running various applications, generating content, presenting content, and so forth.

The actions are performed separate form any containers, so any applications run are not run within a container.

Eventually, a determination is made to end the usage session (act 414). This determination can be made in various manners as discussed above, such as in response to a user input to the computing device, in response to determining that no user input has been received within a threshold amount of time (e.g., 2 minutes), and so forth.

In response to the determination to end the usage session, the usage session is ended while maintaining content generated during the usage session (act 416). Various content generated during the usage session and stored in physical memory and/or storage devices of the computing device is maintained as discussed above.

Returning to FIG. 1, by having the usage session run in a container 120 and the content generated during the usage session deleted, the user of the computing device 100 is alleviated of the need to delete any content generated during the usage session. For example, manual deletion of content generated during the usage session by identifying and deleting files need not be performed. Furthermore, if any handles to any files or other data were to be opened during the usage session, the host operating system 110 need not be concerned with identifying and deleting any such handles. Rather, such handles are automatically deleted when the container is deleted.

The techniques discussed herein support various different scenarios. In one or more embodiments, the techniques discussed herein are implemented in a virtual meeting hosting device that includes a touchscreen operating as a virtual dry erase board, audio functionality (e.g., microphone and speaker), and video functionality (e.g., a camera). A group of users can walk up to the virtual meeting hosting device and have a meeting where various confidential information is discussed, such as product design plans. The virtual meeting hosting device automatically detects the presence of multiple users (e.g., using face recognition) and begins a usage session when the group of users walks up to the virtual meeting hosting device. The virtual meeting hosting device runs the usage session in a container, and deletes the container when the users walk away from the virtual meeting hosting device. The users can thus have their meeting and leave the virtual meeting hosting device confident in the knowledge that none of the confidential information they were discussing is maintained by the virtual meeting hosting device, and thus that the confidential information they were discussing is not accessible to the next users of the virtual meeting hosting device.

In one or more embodiments, the techniques discussed herein are implemented in a smartphone. An owner of the smartphone can unlock the smartphone in various manners (e.g., by inputting his or her PIN, by inputting his or her fingerprint, etc.). In response to the smartphone being unlocked, a usage session begins that is separate from any container. Restrictions to applications and/or data that are defined for containers do not apply to the owner, so the owner can access his or her email, his or her phone contacts list, and so forth. At another time, the owner can choose to loan the smartphone to a friend. A usage session begins, such as in response to the friend inputting a swipe gesture on the smartphone but not unlocking the smartphone by inputting a PIN or fingerprint. The friend can then use the smartphone to make a phone call, confident in the knowledge that when the usage session ends any content generated during the usage session (e.g., the phone number dialed) is deleted. Furthermore, the restrictions to applications and/or data that are defined by the owner for containers on the smartphone apply to the friend's usage session, so the owner of the computing device is confident in the knowledge that the friend does not have access to the owner's email, to owner's contact list, and so forth.

In one or more embodiments, the techniques discussed herein are implemented in laptop computers that are regularly shared, such as in an educational setting (e.g., carts of laptops that are shared by different school classrooms throughout the day). A user starts using the laptop, beginning a usage session. The user can interact with the laptop, generating various different content. When the user stops using the laptop, the usage session ends. The user can then leave the laptop for another user to use, confident in the knowledge that any content generated by the user during his or her usage session is deleted automatically by the computing device.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 5:
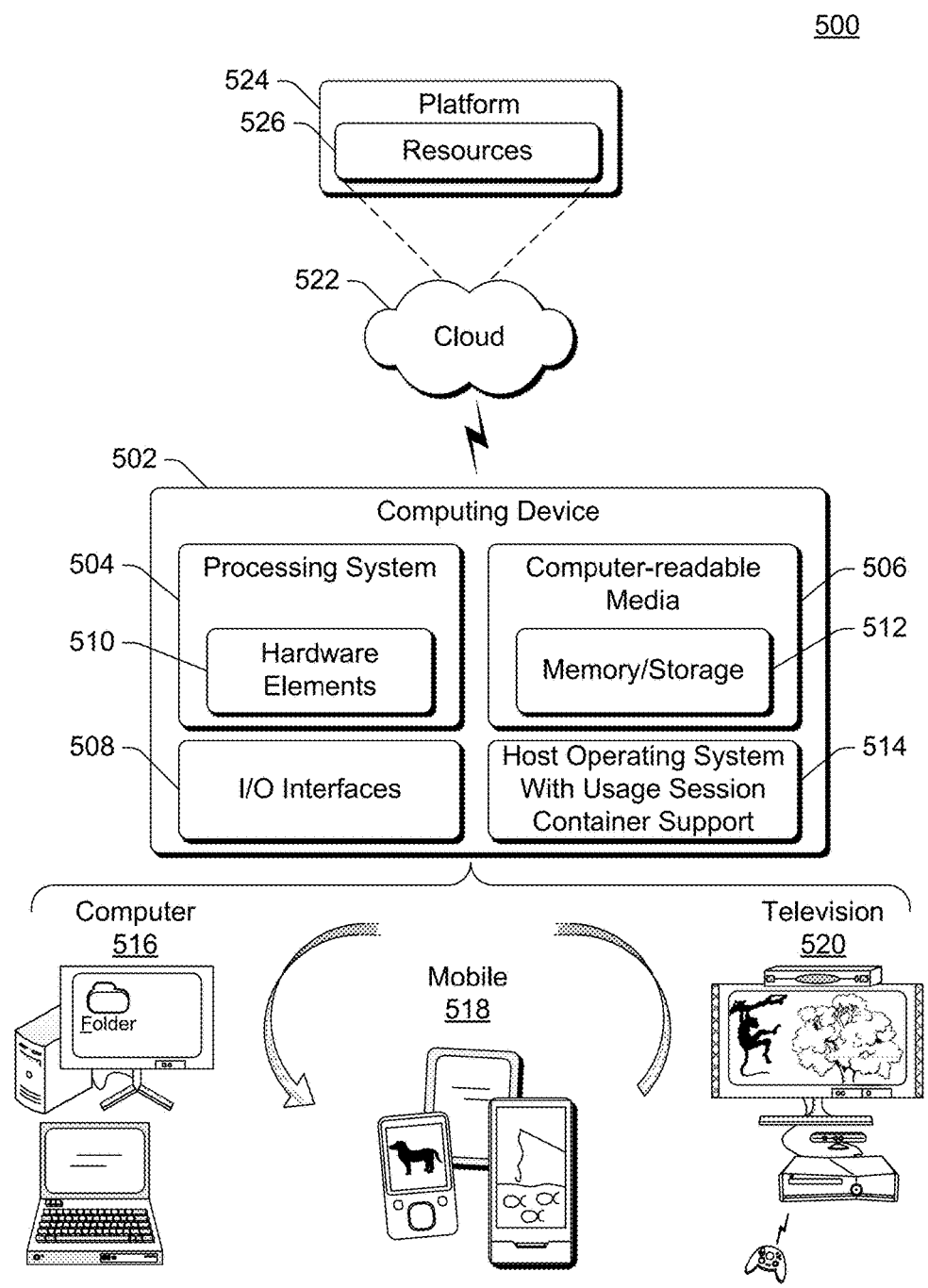
FIG. 5 illustrates an example system that includes an example computing device that is representative of one or more systems and/or devices that may implement the various techniques described herein.

FIG. 5 illustrates an example system generally at 500 that includes an example computing device 502 that is representative of one or more systems and/or devices that may implement the various techniques described herein. The computing device 502 may be, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O Interfaces 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 506 is illustrated as including memory/storage 512. The memory/storage 512 represents memory/storage capacity associated with one or more computer-readable media. The memory/storage 512 may include volatile media (such as random access memory (RAM)) and/or nonvolatile media (such as read only memory (ROM), Resistive RAM (ReRAM), Flash memory, optical disks, magnetic disks, and so forth). The memory/storage 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

The one or more input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 502 may be configured in a variety of ways as further described below to support user interaction.

The computing device 502 also includes a host operating system with usage session container support 514. The host operating system with usage session container support 514 provides various functionality for running usage sessions in containers, as discussed above. The host operating system with usage session container support 514 can implement, for example, the host operating system 110 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 510 and computer-readable media 506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of modules as a module that is executable by the computing device 502 as software may be achieved at least partially in hardware, e.g., through use of computer-readable storage media and/or hardware elements 510 of the processing system. The instructions and/or functions may be executable/operable by one or more articles of manufacture (for example, one or more computing devices 502 and/or processing systems 504) to implement techniques, modules, and examples described herein.

As further illustrated in FIG. 5, the example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 502 may assume a variety of different configurations, such as for computer 516, mobile 518, and television 520 uses. Each of these configurations includes devices that may have generally different constructs and capabilities, and thus the computing device 502 may be configured according to one or more of the different device classes. For instance, the computing device 502 may be implemented as the computer 516 class of a device that includes a personal computer, desktop computer, a multi-screen computer, laptop computer, netbook, and so on.

The computing device 502 may also be implemented as the mobile 518 class of device that includes mobile devices, such as a mobile phone, portable music player, portable gaming device, a tablet computer, a multi-screen computer, and so on. The computing device 502 may also be implemented as the television 520 class of device that includes devices having or connected to generally larger screens in casual viewing environments. These devices include televisions, set-top boxes, gaming consoles, and so on.

The techniques described herein may be supported by these various configurations of the computing device 502 and are not limited to the specific examples of the techniques described herein. This functionality may also be implemented all or in part through use of a distributed system, such as over a "cloud" 522 via a platform 524 as described below.

The cloud 522 includes and/or is representative of a platform 524 for resources 526. The platform 524 abstracts underlying functionality of hardware (e.g., servers) and software resources of the cloud 522. The resources 526 may include applications and/or data that can be utilized while computer processing is executed on servers that are remote from the computing device 502. Resources 526 can also include services provided over the Internet and/or through a subscriber network, such as a cellular or Wi-Fi network.

The platform 524 may abstract resources and functions to connect the computing device 502 with other computing devices. The platform 524 may also serve to abstract scaling of resources to provide a corresponding level of scale to encountered demand for the resources 526 that are implemented via the platform 524. Accordingly, in an interconnected device embodiment, implementation of functionality described herein may be distributed throughout the system 500. For example, the functionality may be implemented in part on the computing device 502 as well as via the platform 524 that abstracts the functionality of the cloud 522.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method implemented in a computing device, the method comprising: determining a usage session for a user accessing the computing device is beginning; automatically determining, in response to the usage session beginning, to run the usage session in a container; performing actions for the usage session in a container associated with the usage session; determining the usage session is ending; and deleting, in response to the usage session ending, the container associated with the usage session and content generated during the usage session.

Alternatively or in addition to any of the above described methods, any one or combination of: the determining the usage session is beginning comprising determining the usage session is beginning in response to detecting at least one user in close physical proximity to the computing device; the determining the usage session is ending comprising determining the usage session is ending in response to no user being detected in close physical proximity to the computing device or in response to a shutdown of the computing device being imminent; the method further comprising determining an additional usage session for an additional user accessing the computing device is beginning, automatically determining, in response to the additional usage session beginning, to run the usage session without a container, performing actions for the additional usage session separate from any containers on the computing device, determining the additional usage session is ending, and ending the usage session while maintaining content generated during the usage session; the determining the additional usage session is beginning comprising determining that the additional usage session is beginning in response to the computing device being unlocked; the determining the additional usage session is beginning comprising determining that the computing device is to be unlocked in response to a user input to the computing device; the method further comprising determining an additional usage session for an additional user accessing the computing device is beginning, the usage session and the additional usage session being two different usage sessions, automatically determining, in response to the additional usage session beginning, to run the usage session in an additional container, the container and the additional container being two different containers, performing actions for the additional usage session in the additional container associated with the additional usage session, and determining the additional usage session is ending, and deleting, in response to the additional usage session ending, the additional container and content generated during the additional usage session; the automatically determining comprising automatically determining to run the usage session in the container in response to a particular user input being received at the computing device; the automatically determining comprising automatically determining to run the usage session in the container in response to a particular user input not being received at the computing device; the deleting content generated during the usage session including deleting content from physical memory of the computing device; the deleting content generated during the usage session including deleting content from a storage device of the computing device; the method further comprising determining a class or group of the user, and selecting, as the container associated with the usage session, a type of container that is associated with the class or group of the user.

A computing device comprising: a usage session determination module configured to determine that a first usage session for a first user accessing the computing device is beginning; an access mode determination module configured to automatically determine, in response to the first usage session beginning, to run the first usage session in a first container associated with the first usage session; a virtualization module configured to support performing actions for the first usage session in the first container; the usage session determination module being further configured to determine that the first usage session is ending, and the virtualization module being further configured to delete, in response to the first usage session ending, the first container and content generated during the first usage session.

Alternatively or in addition to any of the above described computing devices, any one or combination of: wherein the usage session determination module is further configured to determine the first usage session is beginning in response to detecting at least one user in close physical proximity to the computing device or in response to detecting a user input to the computing device that is not unlocking the computing device; wherein the virtualization module is further configured to, in response to the first usage session ending, delete content from a storage device of the computing device and overwrite memory allocated to the first container.

A computing device comprising: a processor; and a computer-readable storage media having stored thereon multiple instructions that, when executed by the processor, cause the processors to: determine a first usage session for a first user accessing the computing device is beginning; automatically determine, in response to the first usage session beginning, to run the first usage session in a first container associated with the first usage session; perform actions for the first usage session in the first container; determine the first usage session is ending; and delete, in response to the first usage session ending, the first container and content generated during the first usage session.

Alternatively or in addition to any of the above described computing devices, any one or combination of: the multiple instructions further causing the processor to determine a second usage session for a second user accessing the computing device is beginning, automatically determine, in response to the second usage session beginning, to run the second usage session without a container, perform actions for the second usage session separate from any containers on the computing device, determine the second usage session is ending, and end the second usage session while maintaining content generated during the second usage session; the multiple instructions further causing the processor to determine a second usage session for a second user accessing the computing device is beginning, the first usage session and the second usage session being two different usage sessions, automatically determine, in response to the second usage session beginning, to run the second usage session in a second container associated with the second usage session, the first container and the second container being two different containers, perform actions for the second usage session in the second container associated with the second usage session, determine the second usage session is ending, and delete, in response to the second usage session ending, the second container and content generated during the second usage session; wherein to delete the content generated during the first usage session is to delete content from a storage device of the computing device; wherein to delete the content generated during the first usage session is further to overwrite portions of the storage device where the content generated during the first usage session was stored.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a computing device, the method comprising:
   determining whether a user attempting to access the computing device is included in a set of known users;
   responsive to a determination that the user is included in the set of known users, running a usage session in which the user accesses the computing device separate from any containers on the computing device; and
   responsive to a determination that the user is not included in the set of known users:
   associating the usage session with a container;
   performing actions for the usage session in the container;
   determining the usage session is ending; and
   deleting, in response to the usage session ending, the container associated with the usage session and content generated during the usage session.

2. The method as recited in claim 1, wherein determining whether the user is included in the set of known users is based on identifying the user with one or more recognition techniques.

3. The method as recited in claim 1, further comprising determining the usage session is ending in response to no user being detected in close physical proximity to the computing device or in response to a shutdown of the computing device being imminent.

4. The method as recited in claim 1, further comprising:
   determining that the user is included in the set of known users;
   performing the actions for the usage session separate from any containers on the computing device;
   determining the usage session is ending; and
   ending the usage session while maintaining content generated during the usage session.

5. The method as recited in claim 1, wherein determining whether the user attempting to access the computing device is included in the set of known users is in response to the computing device being unlocked.

6. The method as recited in claim 1, wherein determining whether the user attempting to access the computing device is included in the set of known users is in response to a user input to unlock the computing device.

7. The method as recited in claim 1, further comprising:
   determining whether an additional user attempting to access the computing device is included in the set of known users;
   responsive to a determination that the additional user is included in the set of known users, running an additional usage session in which the additional user accesses the computing device separate from any containers in the computing device; and
   responsive to a determination that the additional user is not included in the set of known users:

associating the additional usage session with an additional container, the container and the additional container being two different containers;
performing actions for the additional usage session in the additional container; and
determining the additional usage session is ending, and deleting, in response to the additional usage session ending, the additional container and content generated during the usage session.

8. The method as recited in claim 1, wherein determining whether the user attempting to access the computing device is included in the set of known users is based on a particular user input being received at the computing device.

9. The method as recited in claim 1, wherein determining whether the user attempting to access the computing device is included in the set of known users is based on a particular user input not being received at the computing device.

10. The method as recited in claim 1, wherein deleting the content generated during the usage session includes deleting at least some of the content from physical memory of the computing device.

11. The method as recited in claim 1, wherein deleting the content generated during the usage session includes deleting content from a storage device of the computing device.

12. The method as recited in claim 1, further comprising:
determining a class or group of the user; and
selecting, as the container associated with the usage session, a type of container that is associated with the class or group of the user.

13. A computing device comprising:
a usage session determination module implemented at least partially in hardware of the computing device to determine that a first usage session for a first user accessing the computing device is beginning;
an access mode determination module implemented at least partially in the hardware of the computing device to determine whether the first user is included in a set of known users, determine to run the first usage session without a container in response to a determination that the first user is included in the set of known users, and determine to run the first usage session in a first container in response to a determination that the first user is not included in the set of known users;
a virtualization module implemented at least partially in the hardware of the computing device to support performing actions for the first usage session in the first container; and
the virtualization module further configured to delete the first container and content generated during the first usage session in response to the first usage session that is running in the first container ending.

14. The computing device as recited in claim 13, wherein the usage session determination module is further configured to determine the first usage session is beginning in response to detecting at least one user in close physical proximity to the computing device or in response to detecting a user input to the computing device that is not unlocking the computing device.

15. The computing device as recited in claim 13, wherein the virtualization module is further configured to, in response to the first usage session running in the first container ending, delete content from a storage device of the computing device and overwrite memory allocated to the first container.

16. A computing device comprising:
a processor; and
a computer-readable storage media having stored thereon multiple instructions that, when executed by the processor, cause the processors to:
determine whether to run a first usage session in a container based on receipt of a particular input;
run the first usage session separate from any containers in response to a determination made not to run the first usage session in a container based on the particular input being received; and
run the first usage session in a first container in response to a determination made to run the first usage session in a first container based on the particular input not being received.

17. The computing device as recited in claim 16, wherein the multiple instructions further cause the processor to:
determine whether to run a second usage session in a container based on receipt of the particular input;
run the second usage session separate from any containers in response to a determination made not to run the second usage session in a container based on the particular input being received; and
run the second usage session in a second container in response to a determination made to run the second usage session in a second container based on the particular input not being received.

18. The computing device as recited in claim 17, wherein the multiple instructions further cause the processor to:
determine that the second usage session is to be run in the second container based on the particular input not being received, the first container and the second container being two different containers;
perform actions for the second usage session in the second container;
determine the second usage session is ending; and
delete, in response to the second usage session ending, the second container and content generated during the second usage session.

19. The computing device as recited in claim 16, wherein the multiple instructions further cause the processor to delete the content generated during the first usage session in response to the first usage session running in the first container ending, wherein the deletion is to delete at least some of the content from a storage device of the computing device.

20. The computing device as recited in claim 19, wherein to delete the content generated during the first usage session is further to overwrite portions of the storage device where the content generated during the first usage session was stored.

* * * * *